(12) United States Patent
Zhou et al.

(10) Patent No.: US 8,932,487 B2
(45) Date of Patent: Jan. 13, 2015

(54) STRONTIUM CERATE LUMINESCENT MATERIAL AND THE PREPARATION METHOD AND APPLICATION THEREOF

(75) Inventors: Mingjie Zhou, Guangdong (CN); Jun Liu, Guangdong (CN); Wenbo Ma, Guangdong (CN)

(73) Assignee: Ocean King Lighting Science & Technology Co., Ltd., Guangdong (CN)

( * ) Notice: Subject to any disclaimer, the term of this patent is extended or adjusted under 35 U.S.C. 154(b) by 237 days.

(21) Appl. No.: 13/702,134

(22) PCT Filed: Jun. 17, 2010

(86) PCT No.: PCT/CN2010/074030
§ 371 (c)(1),
(2), (4) Date: Dec. 5, 2012

(87) PCT Pub. No.: WO2011/156960
PCT Pub. Date: Dec. 22, 2011

(65) Prior Publication Data
US 2013/0082208 A1      Apr. 4, 2013

(51) Int. Cl.
*C09K 11/02* (2006.01)
*C09K 11/08* (2006.01)
(Continued)

(52) U.S. Cl.
CPC ........... *C09K 11/873* (2013.01); *C09K 11/7718* (2013.01); *C09K 11/87* (2013.01); *B82Y 40/00* (2013.01); *Y10S 977/773* (2013.01); *Y10S 977/896* (2013.01)
USPC ...................... 252/301.4 R; 977/773; 977/896

(58) Field of Classification Search
CPC .......................... C98K 11/7718; C98K 11/873
USPC .................................................. 252/301.4 R
See application file for complete search history.

(56) References Cited

U.S. PATENT DOCUMENTS 6,013,199 A      1/2000   McFarland et al.

FOREIGN PATENT DOCUMENTS

CN          1584114 A        2/2005

OTHER PUBLICATIONS

Sankar. Eu31 Luminescence, Ce41 r Eu31 Energy Transfer, and White-Red Light Generation in Sr2CeO4. Journal of the Electrochemical Society, 147 (7) 2773-2779 (2000).*

(Continued)

*Primary Examiner* — Matthew E Hoban
(74) *Attorney, Agent, or Firm* — Rosenberg, Klein & Lee

(57) ABSTRACT

Disclosed is a strontium cerate luminescent material having a chemical formula of $Sr_2CeO_4{:}xM$ and comprising the luminescent material $Sr_2CeO_4$ and metal nanoparticle M, and the preparation method thereof, where M is at least one of Ag, Au, Pt and Pd, and x is a molar ratio of M to the luminescent material $Sr_2CeO_4$ and $0<x\leq1\times10^{-2}$. The strontium cerate luminescent material of the present invention, through doping the luminescent material with metal particles, improves luminous intensity of the luminescent material by making use of the surface plasmon resonance generated by surface of the metal particles; besides, the doped metal ion can improve electrical conductivity of the luminescent material, and guarantee that the luminescent material has higher brightness in field emission devices or LEDs. The preparation method of the present invention has the advantages of simple operation, no pollution, easy control, low requirements for equipment, and being favorable to industrialized production.

10 Claims, 2 Drawing Sheets

(51) Int. Cl.
 C09K 11/77 (2006.01)
 C09K 11/87 (2006.01)
 B82Y 40/00 (2011.01)

(56) References Cited

OTHER PUBLICATIONS

Xing. Superfine Sr2CeO4 powder with blue-emission prepared by microemulsion method.Materials Letters 59 (2005) 948-952.*
Gomes. Morphological Study of Sr2CeO4 Blue Phosphor With Fine Particles. Quim. Nova, vol. 27, No. 5, 706-708, 2004.*
Yu-Lin Min, et al.; "Au@Y2O3:Eu3+ rare earth oxide hollow submicrospheres with encapsulated gold nanoparticles and their optical properties"; Solid State Sciences; vol. 11, 2009, pp. 96-101.
Fan Zhang, et al.; "Fabrication of Ag@SiO2@Y2O3:Er Nanostructures for Bioimaging: Tuning of the Upconversion Fluorescence with Silver Nanoparticles"; Journal American Chemical Society; 2010; vol. 132, pp. 2850-2851.
Han-Pu Liang, et al.; "Gold Hollow Nanospheres: Tunable Surface Plasmon Resonance Controlled by Interior-Cavity Sizes"; J. Phys. Chem. B; 2005; vol. 109, pp. 7795-7800.
Gao, et al.; "Progress in Study of Novel Phosphor Sr2CeO4"; Chinese Rare Earths; Apr. 2008, vol. 29, No. 2, pp. 60-65.
He Xianghong, et al.; "Luminescence Performance of Novel Sr2CeO4:RE3+ (RE=Eu,Sm,Dy) Phosphors with Tunable Emission Colors"; Rare Metal Materials and Engineering; May 2007; vol. 36, No. 5, pp. 759-763.
Zhai Yongqing, et al; "Synthesis and Luminescent Properties of Superfine Sr2CeO4 Phosphors by Sol-Gel Auto- Combustion Method"; Journal of Rare Earths; 2006, vol. 24, pp. 281-284.
Communication from the Chinese Patent Office regarding a counterpart foreign application dated Jul. 2, 2013.

* cited by examiner

STRONTIUM CERATE LUMINESCENT MATERIAL AND THE PREPARATION METHOD AND APPLICATION THEREOF

FIELD OF THE INVENTION

The present invention relates to the field of luminescent material and illumination technology, and particularly to a strontium cerate luminescent material and the preparation method and application thereof

BACKGROUND OF THE INVENTION

There are mainly two types of conventional commercial field emission (FED) luminescent materials, the sulfide system and the oxide system. The sulfide system includes blue powder ZnS:AgCl and $SrGa_2S_4$:Ce, green powder $SrGa_2S_4$:Eu and red powder $Y_2O_2S$:Eu. The fluorescent powder of the sulfide series has higher luminous efficiency but poor stability, easy to decompose to produce sulphur under the low-voltage large-current electron beam bombardment, which makes the properties of the material itself deteriorate on one hand and the cathode electron emission needle seriously "poisoned" by sulphur on the other hand. The oxide system mainly includes blue powder $Y_2SiO_5$:Ce, green powder $ZnGa_2O_4$:Mn, $Y_2SiO_5$:Tb and $Y_3Al_5O_{12}$:Tb, and red powder $Y_2O_3$:Eu. The fluorescent powder of the oxide series has higher stability, but not sufficiently high luminous efficiency under the low-voltage electron beam bombardment; and all the fluorescent powder of the oxide series is an insulator, making its use in the FED device subject to certain restrictions.

SUMMARY OF THE INVENTION

Thus it is necessary to provide a strontium cerate luminescent material having good stability and high luminous efficiency.

A strontium cerate luminescent material is provided, having a chemical formula of $Sr_2CeO_4$:xM and comprising the luminescent material $Sr_2CeO_4$ and the metal nanoparticle M, where M is at least one of Ag, Au, Pt and Pd, and x is a molar ratio of M to the luminescent material $Sr_2CeO_4$ and $0<x\leq 1\times 10^{-2}$. Preferably, x is in the range of $1\times 10^{-5} \leq x \leq 1\times 10^{-3}$.

The strontium cerate having the above chemical structure can be used as the blue luminescent material in the field emission light-emitting device or LED.

In addition, it is necessary to provide a method of preparation of the strontium cerate luminescent material having good stability and high luminous efficiency.

A preparation method of the strontium cerate luminescent material is provided, comprising: S1, mixing a metal compound solution, an assistant for stable dispersion and a reductant solution, and stirring to react to produce a metal nanoparticle sol, where the metal nanoparticle is at least one of Ag, Au, Pt, Pd and Cu; S2, adding an Sr salt solution and a Ce salt solution of a desired amount into anhydrous ethanol according to a ratio as shown by the chemical formula $Sr_2CeO_4$:xM, adding a complexing agent and a dispersing agent, and stirring sufficiently to produce a mixed solution; M is the above metal nanoparticle, and x is a molar ratio of M to the luminescent material $Sr_2CeO_4$ and $0<x\leq 1\times 10^{-2}$; S3, adding the metal nanoparticle sol into the above mixed solution, and stirring to react to obtain a strontium cerate luminescent material sol, and then drying before heat treatment to produce the desired strontium cerate luminescent material.

Preferably, the assistant has a concentration of $1.5\times 10^{-4}$~$2.1\times 10^{-3}$ g/mL in the metal nanoparticle sol; the reductant solution has a concentration of $1\times 10^{-3}$~$1\times 10^{-2}$ mol/L, and the amount ratio of the reductant to the metal nanoparticle is from 1.2:1 to 4.8:1.

Preferably, the metal compound is selected from at least one of the group consisting of $AgNO_3$, $AuCl_3 \cdot HCl \cdot 4H_2O$, $H_2PtCl_6 \cdot 6H_2O$ and $PdCl_2 \cdot 2H_2O$; the assistant is selected from at least one of the group consisting of polyvinylpyrrolidone, sodium citrate, cetyl trimethylammonium bromide, sodium lauryl sulfate and sodium dodecanesulphonate; and the reductant is selected from at least one of the group consisting of hydrazine hydrate, ascorbic acid and sodium borohydride.

Preferably, the method further includes steps of surface treatment on the obtained metal nanoparticle sol, which are specifically as follows: adding a desired amount of the surface treatment agent into the metal nanoparticle sol according to the volume of the metal nanoparticle sol, and stirring at room temperature for 3~24 h to make the surface treatment agent have a concentration of 0.001-0.1 g/mL in the final sol.

Preferably, the surface treatment agent is polyvinylpyrrolidone.

Preferably, the Sr salt and the Ce salt are $Sr(NO_3)$, and $Ce(NO_3)_3$, respectively; the complexing agent is citric acid monohydrate, a ratio of which to a molar sum of Sr and Ce is from 1:1 to 3:1; and the dispersing agent is polyethylene glycol.

Preferably, the heat treatment includes presintering and calcining, with a presintering temperature at 500° C.~800° C. and a presintering duration of 2~7 h, and a calcining temperature at 800° C.~1300° C. and a calcining duration of 2~6 h.

The above strontium cerate luminescent material of the oxide system has good stability and, with the luminescent material doped with metal particles, improved luminous intensity by making use of the surface plasmon resonance generated by surface of the metal particles; besides, the doped metal ion can improve electrical conductivity of the luminescent material, and guarantee that the luminescent material has higher brightness in field emission devices or LED.

In addition, the strontium cerate luminescent material prepared by the above method has stable properties and high luminous efficiency, and the preparation method has the advantages of simple operation, no pollution, easy control, low requirements for equipment, and being favorable to industrialized production.

DETAILED DESCRIPTION OF THE EMBODIMENTS

Figure 1:
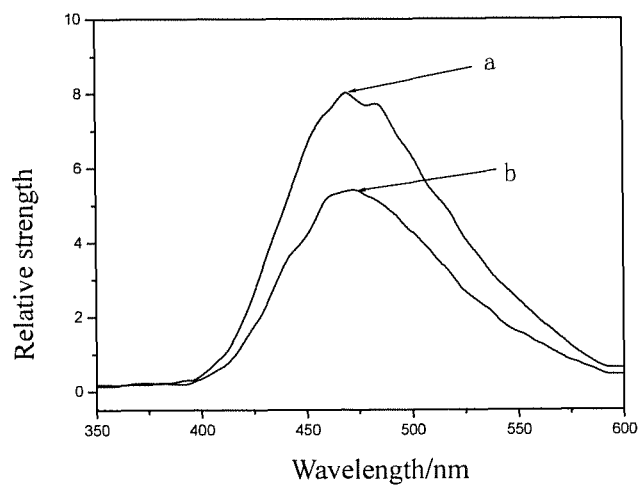
FIG. 1 is a comparison diagram of the luminescent spectra of the luminescent materials prepared in Example 3 under the cathode ray excitation with an acceleration voltage of 1.5 kV, where the curve a is the emission spectrum of the $Sr_2CeO_4$:$5\times 10^{-5}$ Ag luminescent material with the addition of Ag nanoparticles, and the curve b is the emission spectrum of the $Sr_2CeO_4$ luminescent material without the addition of Ag metal nanoparticles.

Through the addition of metal nanoparticles into the luminescent material, the luminous intensity of the luminescent material is improved by making use of the surface plasmon (SP) resonance effect generated by the surface of metal nanoparticles. The surface plasmon produced by the surface of metal nanoparticles is a wave propagating along an interface between a metal and a medium, whose amplitude is damped exponentially with the distance away from the interface. When the luminescent material is doped with metal particles, the property, dispersion relation, excitation mode, coupling effect and the like of the surface plasmon polaritons (SPPs) will be changed significantly. The electromagnetic field caused by SPPs can not only limit propagation of a light wave in a sub-wavelength sized structure, but also produce and control electromagnetic radiation from the optical frequencies to the microwave region, realizing active control of the light propagation, thus increasing optical state density and spontaneous radiation velocity of the luminescent material. Besides, the internal quantum efficiency of the luminescent material can be improved greatly by making use of the coupling effect of the surface plasmon, thus improving the luminous intensity of the luminescent material.

In the following is provided the strontium cerate luminescent material used as the blue luminescent material in the field emission light-emitting device (FED) or LED, which has a chemical formula of $Sr_2CeO_4$:xM and comprises the luminescent material $Sr_2CeO_4$ and the metal nanoparticle M, where M is at least one of Ag, Au, Pt and Pd, and x is a molar ratio of M to the luminescent material $Sr_2CeO_4$ and $0 < x \leq 1 \times 10^{-2}$. Preferably, x is in the range of $1 \times 10^{-5} \leq x \leq 1 \times 10^{-3}$.

The above M is doped in the luminescent material $Sr_2CeO_4$ in a form of metal nanoparticles, and enhances the luminous intensity of the luminescent material $Sr_2CeO_4$ through the surface plasmon resonance effect generated by the surface of metal nanoparticles.

In addition, a method of preparation of the strontium cerate luminescent material is provided, comprising: first preparing the metal nanoparticle sol, and then preparing the strontium cerate luminescent material by mixing $Sr(NO_3)_2$ and $Ce(NO_3)_3$ according to the proportional relation between the metals as shown in the chemical formula. The method is specifically as follows:

I. Preparation of the Metal Nanoparticle Sol:

1) Preparing a metal compound solution, where the metal compound is at least one of $AgNO_3$, $AuCl_3 \cdot HCl \cdot 4H_2O$, $H_2PtCl_6 \cdot 6H_2O$ and $PdCl_2 \cdot 2H_2O$, and the solvent is water or ethanol;

2) dissolving one or more assistants into the above metal compound solution obtained in A1) under the magnetic stirring condition, making the assistant(s) have a concentration of $1.5 \times 10^{-4}$-$2.1 \times 10^{-3}$ g/mL in the final metal nanoparticle sol; the assistant is preferably polyvinylpyrrolidone, sodium citrate, cetyl trimethylammonium bromide, sodium lauryl sulfate or sodium dodecanesulphonate;

3) preparing a reductant solution at a concentration range of $1 \times 10^{-3}$-$1 \times 10^{-2}$ mol/L; the reductant is at least one of hydrazine hydrate, ascorbic acid and sodium borohydride, and the solvent is water or ethanol; and 4) adding the above reductant solution of A3) into the solution containing the assistant(s) obtained in the above A2) under the magnetic stirring condition in an amount ratio of the reductant to the metal ion from 1.2:1 to 4.8:1, and reacting for 10 min −45 min to obtain the metal nanoparticle sol.

Preferably, the metal nanoparticle further needs surface treatment, which is specifically as follows: putting a certain amount of surface treatment agent into the metal nanoparticle sol according to the volume of the metal nanoparticle sol, and stirring at room temperature for 3 h-24 h to make the surface treatment agent have a concentration of 0.001 g/mL-0.1 g/mL in the final sol; and the surface treatment agent is preferably polyvinylpyrrolidone.

II. Preparation of the Strontium Cerate Luminescent Material With a Chemical Formula of $Sr_2CeO_4$:xM:

1) Adding a certain volume of $Sr(NO_3)_2$ solution and $Ce(NO_3)_3$ solution into a beaker according to the chemical formula of $Sr_2CeO_4$:xM, then adding anhydrous ethanol, and stirring sufficiently to obtain a mixed nitrate solution;

2) adding a complexing agent and a dispersing agent into the above obtained mixed nitrate solution, and stirring sufficiently, where the complexing agent is preferably citric acid, and specifically citric acid monohydrate, a molar ratio of which to the total metal ions in the mixed solution is from 1:1 to 3:1, and the dispersing agent is preferably polyethylene glycol;

3) adding the metal nanoparticle sol into the solution obtained in the above step B2), heating and stirring at 70° C.-90° C. in a water bath for 2-6 h to obtain a strontium cerate luminescent material sol; and drying the strontium cerate luminescent material sol at 80° C.-150° C. completely to produce the precursor; and 4) putting the precursor in a high temperature furnace, presintering at 500° C.-800° C. for 2-7 h, cooling to the room temperature, and grinding; then putting it in a box type high temperature furnace or tubular furnace, calcining at 800° C.-1300° C. for 2-6 h, naturally cooling, and grinding to produce the strontium cerate luminescent material with a chemical formula of $Sr_2CeO_4$:xM.

The above strontium cerate luminescent material and the preparation method and luminescent property thereof will further be described below with reference to specific examples.

EXAMPLE 1

Preparation of the Pt nanoparticle sol: Weighing 5.18 mg chloroplatinic acid ($H_2PtCl_6 \cdot 6H_2O$) to dissolve into 17 mL deionized water to obtain the chloroplatinic acid aqueous solution; after chloroplatinic acid is completely dissolved, weighing 8.0 mg sodium citrate and 12.0 mg sodium dodecanesulphonate, and dissolving into the chloroplatinic acid aqueous solution under the magnetic stirring condition; weighing 0.38 mg sodium borohydride to dissolve into 10 mL deionized water to obtain 10 mL sodium borohydride aqueous solution at a concentration of $1 \times 10^{-3}$ mol/L, and meanwhile preparing 10 mL hydrazine hydrate solution at a concentration of $1 \times 10^{-2}$ mol/L; under the magnetic stirring condition, first dropwise adding 0.4 mL sodium borohydride aqueous solution into the chloroplatinic acid aqueous solution and stirring to react for 5 min, then dropwise adding 2.6 mL $1 \times 10^{-2}$ mol/L hydrazine hydrate solution into the chloroplatinic acid aqueous solution, and then continuing to react for 40 min to obtain 20 mL Pt nanoparticle sol with the Pt concentration at $5 \times 10^{-4}$ mol/L; then adding 2 g PVP into the Pt nanoparticle sol, and magnetically stirring for 12 h to produce the Pt nanoparticle having been subject to the surface treatment.

Preparation of 0.001 mol $Sr_2CeO_4$:$1 \times 10^{-2}$Pt: Putting 1 mL 2 mol/L $Sr(NO_3)_2$ solution and 1 mL 1 mol/L $Ce(NO_3)_3$ solution into a beaker, then adding 10 mL ethanol, and stirring sufficiently to obtain a mixed nitrate solution; adding into this mixed solution 0.63042 g citric acid (the molar ratio of the added citric acid to the total metal ions in the mixed solution is 1:1) and 1 g PEG (polyethylene glycol), and stirring sufficiently; taking 20 mL of the above metal particle solution having been processed, and heating and stirring at 70° C. in a water bath for 6 h to produce a sol; drying the sol completely at 80° C. to produce the precursor; putting this precursor in a high temperature furnace, presintering at 500° C. for 7 h, cooling to the room temperature, and grinding; then putting it in a box type high temperature furnace or tubular furnace, calcining at 800° C. for 6 h, naturally cooling, and grinding to produce the $Sr_2CeO_4$:1×10$^{-2}$Pt luminescent material.

EXAMPLE 2

Preparation of the Au nanoparticle sol: Weighing 4.12 mg chloroauric acid ($AuCl_3 \cdot HCl \cdot 4H_2O$) to dissolve into 8.4 mL deionized water to obtain the chloroauric acid aqueous solution; after chloroauric acid is completely dissolved, weighing 14 mg sodium citrate and 6 mg cetyl trimethylammonium bromide, and dissolving into the chloroauric acid aqueous solution under the magnetic stirring condition; weighing 1.9 mg sodium borohydride and 17.6 mg ascorbic acid to dissolve into 10 mL deionized water, respectively, to obtain 10 mL sodium borohydride aqueous solution at a concentration of 5×10$^{-3}$ mol/L and 10 mL ascorbic acid aqueous solution at a concentration of 1×10$^{-2}$ mol/L; under the magnetic stirring condition, first adding 0.04 mL sodium borohydride aqueous solution into the chloroauric acid aqueous solution, stirring to react for 5 min, then adding 1.56 mL 1×10$^{-2}$ mol/L ascorbic acid aqueous solution into the chloroauric acid aqueous solution, and then continuing to react for 30 min to obtain 10 mL Au nanoparticle sol with the Au concentration at 1×10$^{-3}$ mol/L; then taking 6 mL of the obtained Au nanoparticle sol, adding 0.006 g PVP into the Au nanoparticle sol, and magnetically stirring for 8 h to produce the Au nanoparticle having been subject to the surface treatment.

Preparation of 0.01 mol $Sr_2CeO_4$:5×10$^{-4}$Au: Putting 10 mL 2 mol/L $Sr(NO_3)_2$ solution and 10 mL 1 mol/L $Ce(NO_3)_3$ solution into a beaker, then adding 20 mL ethanol, and stirring sufficiently to obtain a mixed nitrate solution; adding into this mixed solution 12.6084 g citric acid (the molar ratio of the added citric acid to the total metal ions in the mixed solution is 2:1) and 1 g PEG (polyethylene glycol), and stirring sufficiently; taking 5 mL of the above metal particle solution having been processed, and heating and stirring at 80° C. in a water bath for 4 h to produce a sol; drying the sol completely at 100° C. to produce the precursor; putting this precursor in a high temperature furnace, presintering at 700° C. for 5 h, cooling to the room temperature, and grinding; then putting it in a box type high temperature furnace or tubular furnace, calcining at 1000° C. for 4 h, naturally cooling, and grinding to produce the $Sr_2CeO_4$:5×10$^{-4}$Au luminescent material.

EXAMPLE 3

Preparation of the Ag nanoparticle sol: Weighing 3.40 mg silver nitrate ($AgNO_3$) to dissolve into 18.4 mL deionized water to obtain the silver nitrate aqueous solution; after silver nitrate is completely dissolved, weighing 22 mg sodium citrate and 20 mg PVP, and dissolving into the silver nitrate aqueous solution under the magnetic stirring condition; weighing 5.7 mg sodium borohydride to dissolve into 10 mL deionized water to obtain 10 mL sodium borohydride aqueous solution at a concentration of 1.5×10$^{-2}$ mol/L; adding 1.6 mL 1.5×10$^{-2}$ mol/L sodium borohydride aqueous solution into the silver nitrate aqueous solution at one time under the magnetic stirring condition, and then continuing to react for 10 min to obtain 20 mL Ag nanoparticle sol with the Ag concentration at 1×10$^{-3}$ mol/L; adding 1 g PVP into the Ag nanoparticle sol, and magnetically stirring for 6 h to produce the Ag nanoparticle having been subject to the surface treatment.

Preparation of 0.01 mol $Sr_2CeO_4$:5×10$^{-5}$Ag: Putting 10 mL 2 mol/L $Sr(NO_3)_2$ solution and 10 mL 1 mol/L $Ce(NO_3)_3$ solution into a beaker, then adding 20 mL ethanol, and stirring sufficiently to obtain a mixed nitrate solution; adding into this mixed solution 12.6084 g citric acid (the molar ratio of the added citric acid to the total metal ions in the mixed solution is 2:1) and 1 g PEG (polyethylene glycol), and stirring sufficiently; taking 0.5 mL of the above metal particle solution having been processed, and heating and stirring at 85° C. in a water bath for 5 h to produce a sol; drying the sol completely at 120° C. to produce the precursor; putting this precursor in a high temperature furnace, presintering at 800° C. for 2 h, cooling to the room temperature, and grinding; then putting it in a box type high temperature furnace or tubular furnace, calcining at 1200° C. for 4 h, naturally cooling, and grinding to produce the $Sr_2CeO_4$:5×10$^{-5}$Ag luminescent material. Preparing the $Sr_2CeO_4$ luminescent material by the same method.

FIG. 1 is a comparison diagram of the luminescent spectra of the luminescent materials prepared in Example 3 under the cathode ray excitation with an acceleration voltage of 1.5 kV, where the curve a is the emission spectrum of the $Sr_2CeO_4$:5×10$^{-5}$Ag luminescent material with the addition of Ag nanoparticles, and the curve b is the emission spectrum of the $Sr_2CeO_4$ luminescent material without the addition of Ag metal nanoparticles. It can be seen from FIG. 1 that this luminescent material is blue-light luminescent material, and luminous intensity of the sample can be improved by 1.5 times after metal doping.

Figure 2:
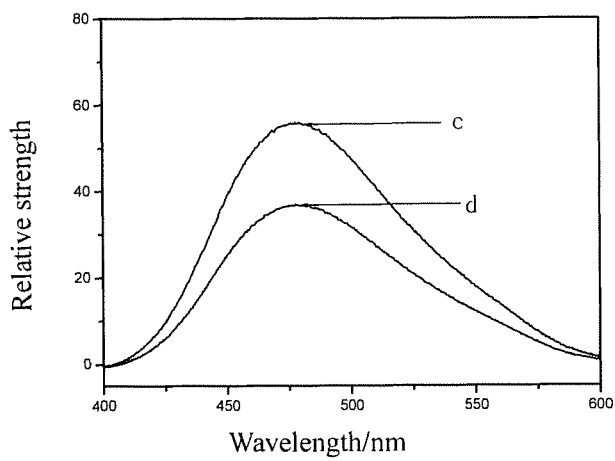
FIG. 2 is a comparison diagram of the emission spectra of the luminescent materials prepared in Example 3 (having an excitation wavelength of 347 nm), where the curve c is the emission spectrum of the luminescent material $Sr_2CeO_4$:$5\times 10^{-5}$ Ag, and the curve d is the emission spectrum of the luminescent material $Sr_2CeO_4$.

FIG. 2 is a comparison diagram of the emission spectra of the luminescent materials prepared in Example 3 (having an excitation wavelength of 347 nm), where the curve c is the emission spectrum of the luminescent material $Sr_2CeO_4$:5×10$^{-5}$Ag, and the curve d is the emission spectrum of the luminescent material $Sr_2CeO_4$. It can be seen from FIG. 2 that the luminous intensity can be improved by 1.5 times after metal doping.

Figure 3:
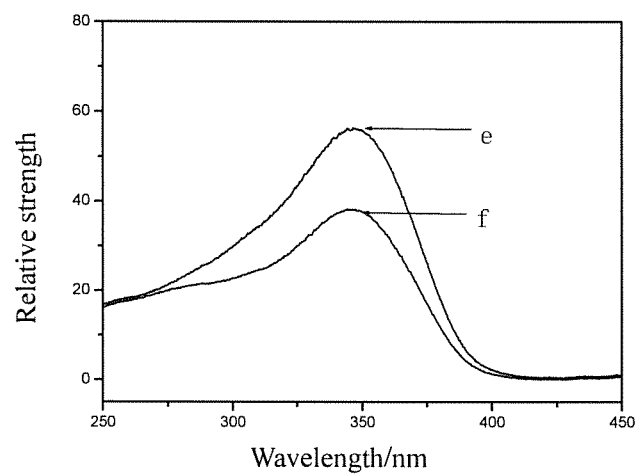
FIG. 3 is a comparison diagram of the excitation spectra of the luminescent materials prepared in Example 3 (having a monitoring wavelength of 475 nm), where the curve e is the excitation spectrum of the luminescent material $Sr_2CeO_4$:$5\times$ $10^{-5}$ Ag, and the curve f is the excitation spectrum of the luminescent material $Sr_2CeO_4$.

FIG. 3 is a comparison diagram of the excitation spectra of the luminescent materials prepared in Example 3 (having a monitoring wavelength of 475 nm), where the curve e is the excitation spectrum of the luminescent material $Sr_2CeO_4$:5×10$^{-5}$Ag, and the curve f is the excitation spectrum of the luminescent material $Sr_2CeO_4$. It can be seen from FIG. 3 that this luminescent material can be used in LED.

EXAMPLE 4

Preparation of the Pd nanoparticle sol: Weighing 0.43 mg palladium chloride ($PdCl_2 \cdot 2H_2O$) to dissolve into 8.5 mL deionized water to obtain the palladium chloride aqueous solution; after palladium chloride is completely dissolved, weighing 11.0 mg sodium citrate and 4.0 mg sodium lauryl sulfate, and dissolving into the palladium chloride aqueous solution under the magnetic stirring condition; weighing 3.8 mg sodium borohydride to dissolve into 10 mL deionized water to obtain a sodium borohydride reducing solution at a concentration of 1×10$^{-2}$ mol/L; adding 0.48 mL 1×10$^{-2}$ mol/L sodium borohydride aqueous solution rapidly into the palladium chloride aqueous solution under the magnetic stirring condition, and then continuing to react for 20 min to obtain 10 mL Pd nanoparticle sol with the Pd concentration at $1\times10^{-4}$ mol/L; then adding 0.5 g PVP into this 10 mL Pd nanoparticle sol, and magnetically stirring for 4 h to produce the Pd nanoparticle having been subject to the surface treatment.

Preparation of 0.01 mol $Sr_2CeO_4:1\times10^{-5}$ Pd: Putting 10 mL 2 mol/L $Sr(NO_3)_2$ solution and 10 mL 1 mol/L $Ce(NO_3)_3$ solution into a beaker, then adding 20 mL ethanol, and stirring sufficiently to obtain a mixed nitrate solution; adding into this mixed solution 18.9126 g citric acid (the molar ratio of the added citric acid to the total metal ions in the mixed solution is 3:1) and 1 g PEG (polyethylene glycol), and stirring sufficiently; taking 1 mL of the above metal particle solution having been processed, and heating and stirring at 90° C. in a water bath for 2 h to produce a sol; drying the sol completely at 150° C. to produce the precursor; putting this precursor in a high temperature furnace, presintering at 800° C. for 2 h, cooling to the room temperature, and grinding; then putting it in a box type high temperature furnace or tubular furnace, calcining at 1300° C. for 2 h, naturally cooling, and grinding to produce the $Sr_2CeO_4:1\times10^{-5}$Pd luminescent material.

EXAMPLE 5

Preparation of the Pt/Au nanoparticle sol: Weighing 6.2 mg chloroauric acid ($AuCl_3.HCl.4H_2O$) and 7.8 mg chloroplatinic acid ($H_2PtCl_6.6H_2O$) to dissolve into 28 mL deionized water to obtain a mixed solution of chloroauric acid and chloroplatinic acid; after dissolving completely, weighing 22 mg sodium citrate and 20 mg PVP, and dissolving into the above mixed solution under the magnetic stirring condition; weighing 5.7 mg of the newly prepared sodium borohydride to dissolve into 10 mL deionized water to obtain 10 mL sodium borohydride aqueous solution at a concentration of $1.5\times10^{-2}$ mol/L; adding 2 mL $1.5\times10^{-2}$ mol/L sodium borohydride aqueous solution into the above mixed solution at one time under the magnetic stirring condition, and then continuing to react for 20 min to obtain 30 mL Pt/Au nanoparticle sol with the total metal concentration at $1\times10^{-3}$ mol/L; adding 2 g PVP into the Pt/Au nanoparticle sol, and magnetically stirring for 6 h to produce the Pt/Au nanoparticle having been subject to the surface treatment.

Preparation of 0.01 mol $Sr_2CeO_4:1\times10^{-3}$Pt/Au: Putting 10 mL 2 mol/L $Sr(NO_3)_2$ solution and 10 mL 1 mol/L $Ce(NO_3)_3$ solution into a beaker, then adding 20 mL ethanol, and stirring sufficiently to obtain a mixed nitrate solution; adding into this mixed solution 18.9126 g citric acid (the molar ratio of the added citric acid to the total metal ions in the mixed solution is 3:1) and 1 g PEG (polyethylene glycol), and stirring sufficiently; taking 10 mL of the above metal particle solution having been processed, and heating and stirring at 80° C. in a water bath for 5 h to produce a sol; drying the sol completely at 100° C. to produce the precursor; putting this precursor in a high temperature furnace, presintering at 500° C. for 5 h, cooling to the room temperature, and grinding; then putting it in a box type high temperature furnace or tubular furnace, calcining at 1000° C. for 3 h, naturally cooling, and grinding to produce the $Sr_2CeO_4:1\times10^{-3}$Pt/Au luminescent material.

The above strontium cerate luminescent material of the oxide system has good stability and, with the luminescent material doped with metal particles, improved luminous intensity by making use of the surface plasmon resonance generated by surface of the metal particles; besides, the doped metal ion can improve electrical conductivity of the luminescent material, and guarantee that the luminescent material has higher brightness in field emission devices or LEDs.

In addition, the strontium cerate luminescent material prepared by the above method has stable properties and high luminous efficiency, and the preparation method has the advantages of simple operation, no pollution, easy control, low requirements for equipment, and being favorable to industrialized production.

The above examples only show several embodiments of the present invention. Although they are described specifically and in detail, they cannot be comprehended as restriction of the scope of the present invention patent. For those of ordinary skill in the art, it should be indicated that some deformation and improvement could also be made without departing from the concept of the present invention, and all fall within the scope of protection of the present invention. Therefore, the scope of protection of the present invention patent shall be determined by the appended claims.

What is claimed is:

1. A strontium cerate luminescent material, having a chemical formula of $Sr_2CeO_4:xM$, the strontium cerate luminescent material comprises luminescent material $Sr_2CeO_4$ and metal nanoparticle M, where M is at least one of Ag, Au, Pt and Pd, and x is a molar ratio of M to the luminescent material $Sr_2CeO_4$ and $0<x\leq1\times10^{-2}$.

2. The strontium cerate luminescent material according to claim 1, characterized in that $1\times10^{-5}\leq x\leq1\times10^{-3}$.

3. An application of the strontium cerate luminescent material according to claim 1 used as a blue luminescent material in a field emission light-emitting device or an LED.

4. A preparation method of a strontium cerate luminescent material, comprising:
   S1, mixing a metal compound solution, an assistant for stable dispersion and a reductant solution, and stirring to react to produce a metal nanoparticle sol, where the metal nanoparticle is at least one of Ag, Au, Pt, Pd and Cu;
   S2, adding an Sr salt solution and a Ce salt solution of a desired amount into anhydrous ethanol according to a ratio as shown by the chemical formula $Sr_2CeO_4:xM$, adding a complexing agent and a dispersing agent, and stirring sufficiently to obtain a mixed solution; M is the metal nanoparticle, and x is a molar ratio of M to the luminescent material $Sr_2CeO_4$ and $0<x\leq1\times10^{-2}$; and
   S3, adding the metal nanoparticle sol into the mixed solution, stirring to react to obtain a strontium cerate luminescent material sol, and then drying the strontium cerate luminescent material sol before heating to produce the desired strontium cerate luminescent material.

5. The method of preparation of the strontium cerate luminescent material according to claim 4, characterized in that the assistant has a concentration of $1.5\times10^{-4}\sim2.1\times10^{-3}$ g/mL in the metal nanoparticle sol; the reductant solution has a concentration of $1\times10^{-3}\sim1\times10^{-2}$ mol/L, and an amount ratio of the reductant to the metal nanoparticle is from 1.2:1 to 4.8:1.

6. The method of preparation of the strontium cerate luminescent material according to claim 4, characterized in that the metal compound is selected from at least one of the group consisting of $AgNO_3$, $AuCl_3.HCl.4H_2O$, $H_2PtCl_6.6H_2O$, and $PdCl_2.2H_2O$;
   the assistant is selected from at least one of the group consisting of polyvinylpyrrolidone, sodium citrate, cetyl trimethylammonium bromide, sodium lauryl sulfate and sodium dodecanesulphonate; and
   the reductant is selected from at least one of the group consisting of hydrazine hydrate, ascorbic acid and sodium borohydride.

7. The method of preparation of the strontium cerate luminescent material according to claim 4, characterized in that it further comprises steps of surface treating the obtained metal nanoparticle sol, which are specifically as follows:

adding a desired amount of a surface treatment agent into the metal nanoparticle sol according to volume of the metal nanoparticle sol, and stirring at room temperature for 3~24 h to make the surface treatment agent have a concentration of 0.0010~1 g/mL in the final sol.

8. The method of preparation of the strontium cerate luminescent material according to claim 7, characterized in that the surface treatment agent is polyvinylpyrrolidone.

9. The method of preparation of the strontium cerate luminescent material according to claim 4, characterized in that the Sr salt is $Sr(NO_3)_2$, and the Ce salt is $Ce(NO_3)_3$;

the complexing agent is citric acid monohydrate, a ratio of which to a molar sum of Sr and Ce is from 1:1 to 3:1; and the dispersing agent is polyethylene glycol.

10. The method of preparation of the strontium cerate luminescent material according to claim 4, characterized in that the heat treatment comprises presintering and calcining, with a presintering temperature at 500° C.~800° C. and a presintering duration of 2~7 h, and a calcining temperature at 800° C.~1300° C. and a calcining duration of 2~6 h.

\* \* \* \* \*